J. BURNS.

Coolers for Coffee.

No. 5,658. Reissued Nov. 18, 1873.

Witnesses.

Ernst Bilhuber

Henry Lentwood

Inventor.

Jabez Burns per

Van Santvoord & Hauff

Attys

AM. PHOTO-LITHOGRAPHIC CO. N.Y. (OSBORNE'S PROCESS)

UNITED STATES PATENT OFFICE.

JABEZ BURNS, OF NEW YORK, N. Y.

IMPROVEMENT IN COOLERS FOR COFFEE.

Specification forming part of Letters Patent No. 61,393, dated January 22, 1867; reissue No. 5,658, dated November 18, 1873; application filed October 2, 1873.

*To all whom it may concern:*

Be it known that I, JABEZ BURNS, of the city and county and State of New York, have invented a new and Improved Cooler for Coffee and substitutes for coffee; and I do hereby declare the following to be a full, clear, and exact description thereof, which will enable others skilled in the art to make and use the same, reference being had to the accompanying drawing forming a part of this specification, in which drawing—

Figure 1:
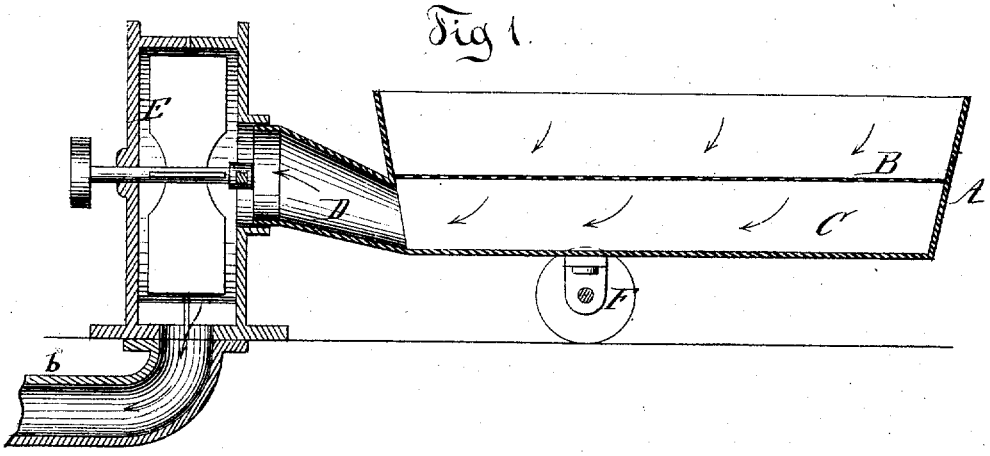
Figure 2:
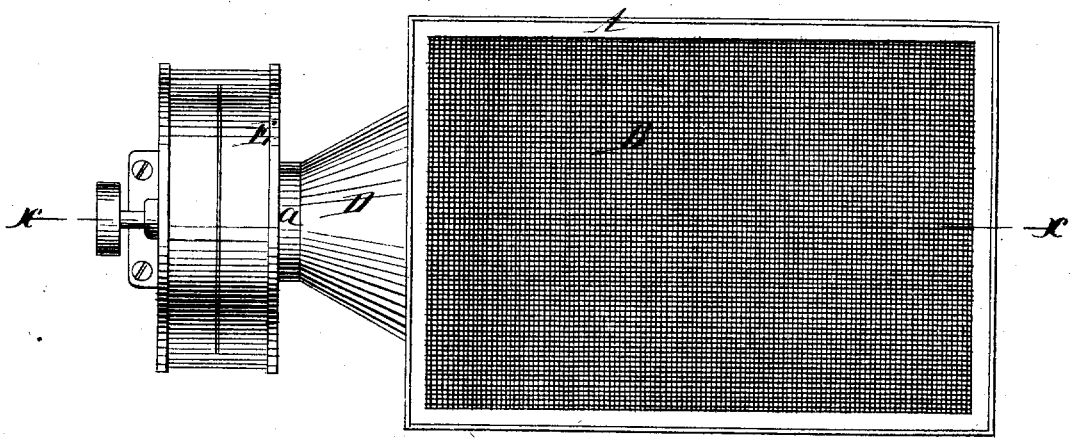

Figure 1 represents a longitudinal vertical section of this invention, the line *x x*, Fig. 2, indicating the plane of section. Fig. 2 is a plan or top view of the same.

Similar letters of reference indicate like parts.

This invention consists in cooling coffee, or substitutes for coffee; and consists of a movable cooler or pan having a perforated bottom for holding the coffee, or substitute for coffee, to be cooled, combined with a suction-blower connected with the cooler in such a manner that the smoke and dust which rise from the coffee, or substitute for coffee, to be cooled are drawn off and prevented from rising into the room where the operation takes place, and all inconvenience as well as danger of fire from that cause is avoided.

A represents a broad flat-bottomed pan or vat, made of sheet metal or any other suitable material, and provided with a perforated false bottom, B, which is placed in the pan at some distance above its real bottom C. From the side of the pan, between the two bottoms B C, proceeds a tube, D, whose outer end is secured in the central aperture *a* of a suction-blower E. The blower in the present instance is secured to the floor at a suitable height to receive the tube D and allow connection to be established between the pan and blower. The pan A may be placed on wheels F, so that it can be readily brought to the proper position to be connected with the blower, and in such case one pan can be readily removed and replaced by another whenever it may be desirable or convenient.

From the bottom of the blower proceeds a discharge-pipe, *b*, which, in the drawing here shown, is conducted down through the floor of the room out of the way of the operatives, and may, if desired, be led to the ash-pan of the furnace of the establishment, or to any place where smoke and dust will not produce any inconvenience.

The coffee or other material to be cooled is poured into the pan A on the perforated bottom, so as to form a stratum of suitable thickness, and connection between the pan and blower being made, the latter is put in motion. A downward current of air is thus caused to pass through the coffee, or substitute for coffee, to be cooled, and the smoke and dust which generally arise from the articles to be cooled are drawn down into the space between the bottoms B and C, and into the blower, whence they are discharged through the pipe B.

In the case of ordinary coolers for coffee, or substitute for coffee, the smoke and dust are allowed to rise and fill the room, and much inconvenience is thereby caused to those who are employed near the cooler; and, furthermore, the heated dust is liable to take fire and cause considerable damage.

By the employment of a downward current of air in cooling, the smoke and dust are drawn down through the mass of coffee or other such substances, and kept from rising in the room or apartment in which the operation is carried on, and discharged elsewhere; and, if desired, said smoke and dust can be utilized by injecting them into the furnace, where they may be used to feed the fire.

What I claim as new, and desire to secure by Letters Patent, is—

1. The movable cooler or pan A, having a perforated bottom for holding the coffee, or substitutes for coffee, to be cooled, in combination with the suction-blower E connected with the cooler, substantially as described, to draw off the smoke and dust from below, as set forth.

2. The stationary suction-blower E, provided with a discharge-pipe, *b*, in combination with the portable cooler A and connecting-tube D, substantially as described, for removing the dust and smoke which rise from the coffee during the operation of cooling, as set forth.

JABEZ BURNS.

Witnesses:
W. HAUFF,
CHAS. WAHLERS.